United States Patent [19]

Roberts, Jr. et al.

[11] 4,048,753
[45] Sept. 20, 1977

[54] HYDROPONIC GARDEN STRUCTURE

[76] Inventors: David B. Roberts, Jr., 211 4th Place, SW.; Joseph L. Wells, 10366 Antilles Drive, both of Largo, Fla. 33540

[21] Appl. No.: 659,551

[22] Filed: Feb. 19, 1976

[51] Int. Cl.² ............................................. A01G 31/00
[52] U.S. Cl. .......................................... 47/59; 47/79
[58] Field of Search .................. 47/1.2, 38, 38.1, 39, 47/48.5, 14, 15, 16, 29, 59–65, 79; 137/624.14, 406, 408; 239/68, 99, 101, 140

[56] References Cited

U.S. PATENT DOCUMENTS

| | | | |
|---|---|---|---|
| 927,245 | 7/1909 | Jackson | 47/38.1 |
| 2,211,445 | 8/1940 | Tiedjens | 47/1.2 X |
| 2,753,662 | 7/1956 | Behnke | 47/29 |
| 2,837,868 | 6/1958 | Skerritt | 47/38 |
| 3,151,069 | 9/1964 | Halpert | 47/1.2 X |
| 3,272,225 | 9/1966 | Frampton | 137/624.14 X |
| 3,451,162 | 6/1969 | Rasmussen | 47/1.2 |
| 3,906,667 | 9/1975 | Williams | 47/38 |
| D. 237,898 | 12/1975 | Austin | 47/1.2 X |

FOREIGN PATENT DOCUMENTS

| | | | |
|---|---|---|---|
| 231,320 | 3/1960 | Australia | 47/38 |
| 841,340 | 5/1939 | France | 47/38.1 |
| 906,152 | 12/1946 | France | 137/406 |
| 550,799 | 4/1932 | Germany | 47/38 |

OTHER PUBLICATIONS

De Groote, "La Vermiculite Dans Ja Culture Des Plantes Horticoles," Apr. 1951, Le Bulletin Horticole, vol. 6, No. 4, pp. 97, 103, 104, 105, 106.
Lott, T. B., "Scientific Apparatus and Laboratory Methods;" A Method for the Automatic Irrigation of Sand Cultures," July 1938, Science, pp. 17 and 18.

*Primary Examiner*—Edgar S. Burr
*Assistant Examiner*—James R. Feyrer
*Attorney, Agent, or Firm*—Clarence A. O'Brien; Harvey B. Jacobson

[57] ABSTRACT

A horizontal tray is provided for growing plants and a liquid nutrient reservoir for receiving a predetermined amount of liquid nutrient therein is supported, in counterbalanced fashion, for vertical shifting relative to the tray between an upper position elevated relative to the tray and a lowered position depressed relative to the tray. The support structure supporting the nutrient reservoir in counterbalanced fashion is slightly overbalanced to cause the support means to shift the nutrient reservoir, by gravity, toward the upper position thereof and a flexible drain tube communicates the lower portions of the interiors of the tray and reservoir for draining nutrient from the reservoir into the tray upon movement of the reservoir to the upper position thereof and return drainage of nutrient from the tray into the reservoir upon subsequent movement of the reservoir to the depressed position thereof, structure being provided to releasably retain the reservoir in the depressed position. A second form of the invention includes a counterbalance water tank for the reservoir operatively connected to a suitable water supply for slow filling of the water tank to an overbalance condition and provided with a drain for slow drainage of water from the tank to an underbalance condition, whereby the reservoir may return, by gravity, to the depressed position thereof.

8 Claims, 6 Drawing Figures

Fig. 1

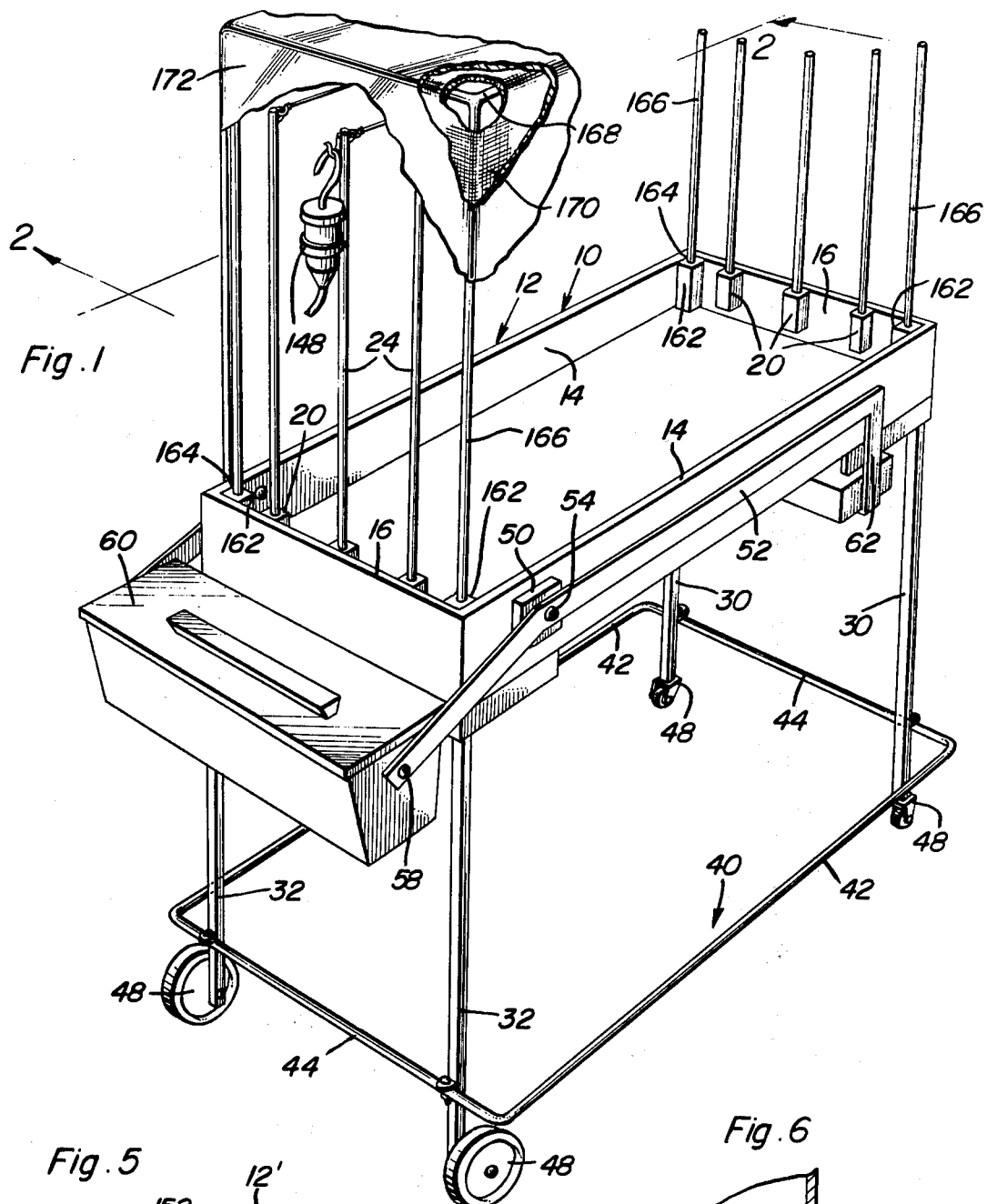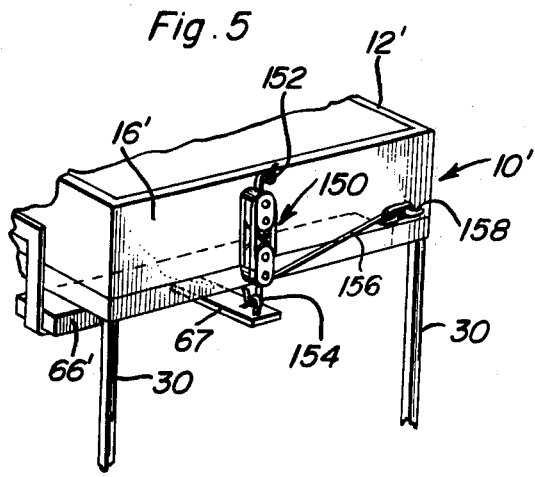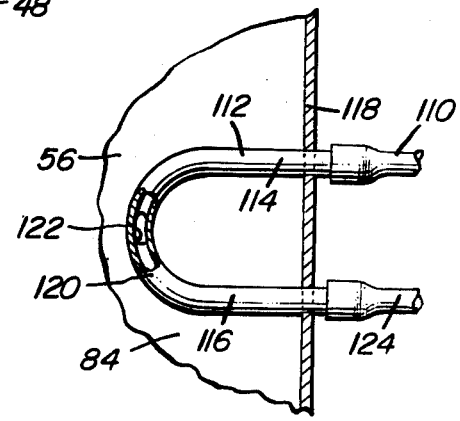

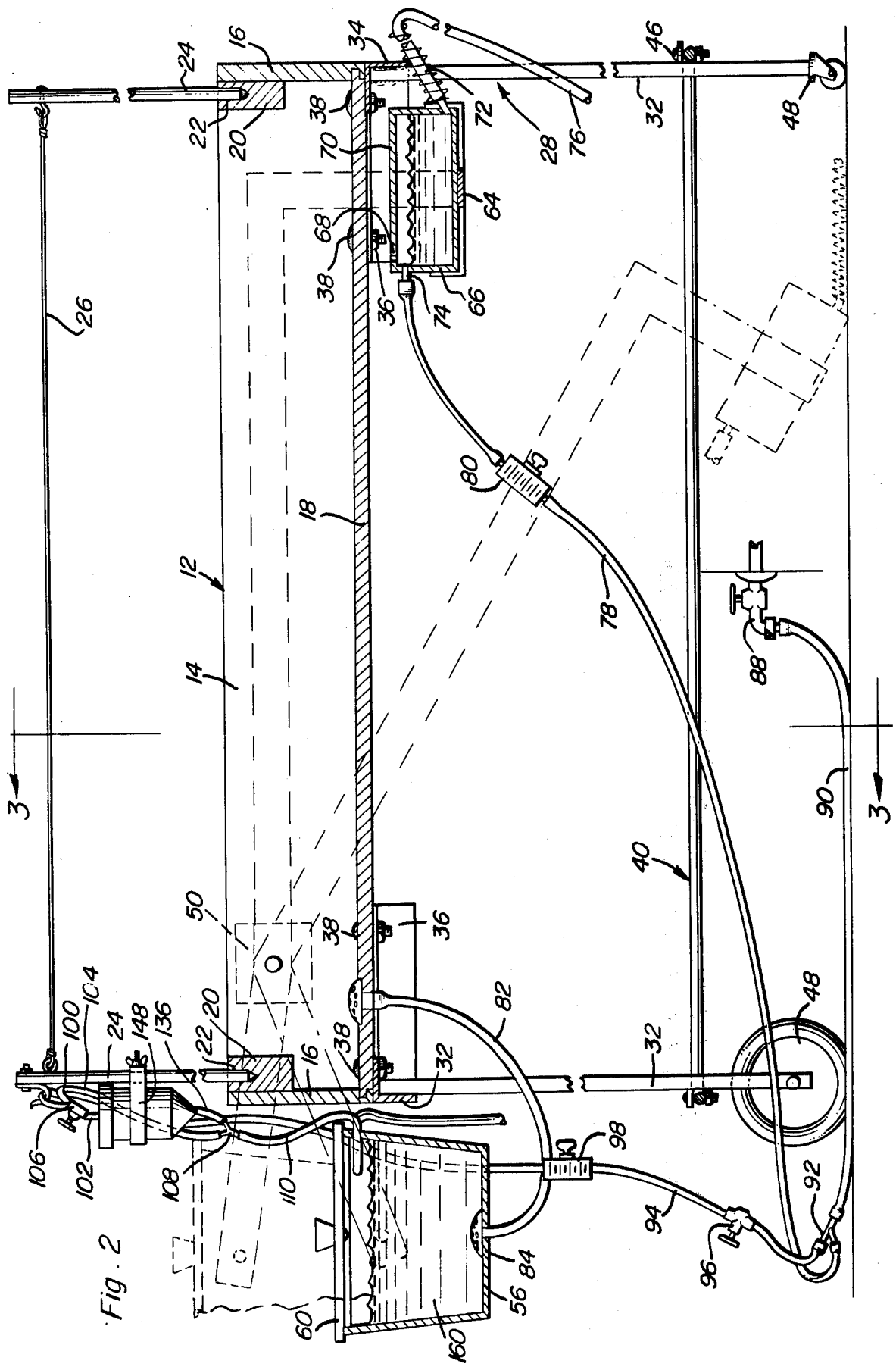

HYDROPONIC GARDEN STRUCTURE

BACKGROUND OF THE INVENTION

Various forms of structures have heretofore been provided defining containers for hydroponic gardens. In addition, other structures have been provided for automatically watering various forms of plant growing mediums. However, a need has arisen for hydroponic garden container which may have the growing medium therein fully saturated with liquid nutrient when watering is desired and yet which may be automatically drained of excess liquid nutrient after each watering and feeding operation. Still further, a need has also arisen for structure whereby a hydroponic garden container may be repeatedly watered in an unattended manner with a liquid nutrient solution over an extended period of time.

Examples of previously known hydroponic garden containers and automatic watering systems utilizing some of the basic structural features of the instant invention are disclosed in U.S. Pat. Nos. 927,245, 1,822,901, 2,747,331, 3,272,225, 3,339,308, 3,696,827 and 3,900,134.

BRIEF DESCRIPTION OF THE INVENTION

The hydroponic garden structure of the instant invention is constructed in a manner whereby the tray portion thereof for growing plants may have the growing medium watered with a liquid nutrient solution to a saturated condition and thereafter have the excess liquid nutrient drained therefrom after a desired time interval.

A second form of the invention includes structure whereby the immediately above referred to watering of the hydroponic garden structure may be repeatedly carried out over an extended period of time in a completely automatic manner.

The main object of this invention is to provide a hydroponic garden container constructed in a manner whereby the plant growing tray portion thereof may have a plant growing medium disposed therein and the growing medium may be selectively saturated with a plant nutrient solution and thereafter have excess plant nutrient solution drained therefrom.

Another object of this invention, in accordance with the immediately preceding object, is to provide a hydroponic garden structure including means whereby saturation of the plant growing medium with a nutrient solution and subsequent drainage of excess nutrient solution from the growing medium may be repeatedly effected over an extended period of time in an automatic manner.

Yet another object of this invention is to provide a hydroponic garden structure, in accordance with the preceding objects, and constructed so as to be mobile for ready movement from one location to another.

A final object of this invention to be specifically enumerated herein is to provide a hydroponic garden structure in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the hydroponic garden structure;

FIG. 2 is a fragmentary enlarged longitudinal, vertical sectional view, taken substantially upon a plane indicated by the section line 2—2 of FIG. 1, and with an alternate elevated position of the liquid nutrient reservoir illustrated in phantom lines;

FIG. 5 is a fragmentary perspective view of the left end of the garden structure illustrated in FIG. 1 illustrating a modified construction; and FIG. 6 is a fragmentary enlarged, horizontal, sectional view illustrating the manner in which supplemental nutrient solution may be added to the nutrient reservoir of the garden structure.

DETAILED DESCRIPTION OF THE INVENTION

Figure 3:
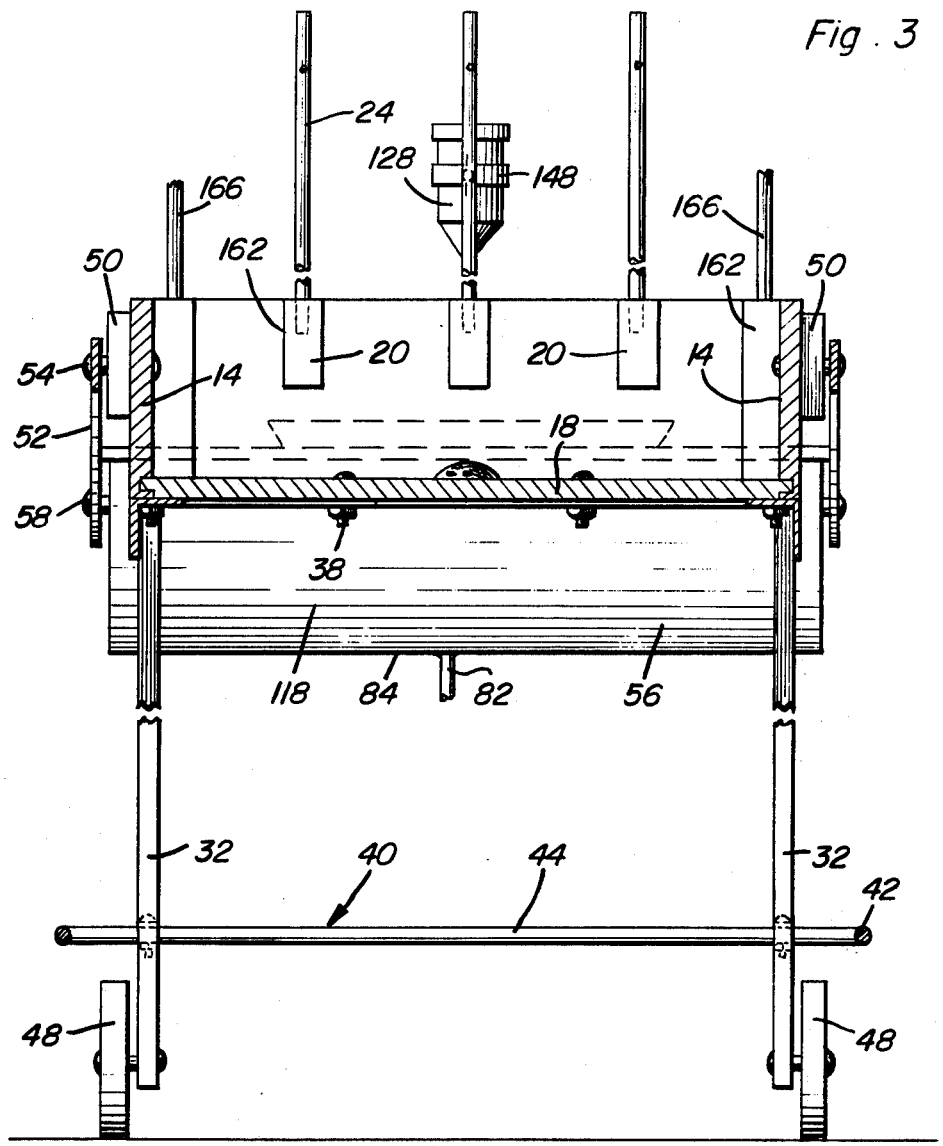
FIG. 3 is a transverse, vertical sectional view taken substantially upon the plane indicated by the section line 3—3 of FIG. 2.

Referring now more specifically to the drawings, the numeral 10 generally designates the hydroponic garden structure of the instant invention. The structure 10 includes a horizontal upwardly opening tray referred to in general by the reference numeral 12 and including upstanding opposite side and end walls 14 and 16 interconnected at their lower marginal edge portions by means of a bottom wall 18 to define a waterproof upwardly opening tray. The inner surface of the opposite end walls 16 each include three transversely spaced mounting blocks 20 defining upwardly opening bores 22 in which the lower ends of support stakes 24 are seatingly received. Plant supporting lines 26 are secured between corresponding end stakes 24 and may have the foliage portions of plants grown within the tray 12 tied thereto by means of vertical lines (not shown).

The garden structure or container 10 includes a support base referred to in general by the reference numeral 28. The base 28 includes pairs of opposite end tubular legs 30 and 32 and the upper ends of each pair of legs 30 and 32 are interconnected by means of a transverse angle member 34. In addition, a pair of short longitudinally extending angle member 36 extend lengthwise of the tray 12 from each of the legs 30 and 32 and the bottom wall 18 of the tray 12 is secured to the angle members 34 and 36 by means of suitable fasteners 38.

The lower ends of the legs 30 and 32 are interconnected by means of a generally rectangular frame referred to in general by the reference numeral 40 and including opposite side longitudinal members 42 spaced appreciably outwardly of the remote sides of each pair of legs 30 and 32 and interconnected at their corresponding ends by means of transverse members 44 extending therebetween and secured to the corresponding legs 30 and 32 by means of fasteners 46. Further, the lower ends of the legs 32 have caster wheel assemblies 48 supported therefrom.

The outer sides of one pair of corresponding ends of the side walls 14 include mounting blocks 50 supported therefrom and a pair of angulated support levers 52 are pivotally supported from the blocks 50 by means of suitable fasteners 54. One pair of corresponding ends of the levers 52 project endwise outwardly of the adjacent end of the tray 12 and have an upwardly opening liquid nutrient reservoir 56 pivotally supported therebetween by means of suitable fasteners 58. The reservoir 56 is provided with a removable cover 60 and is pivotally supported between the levers 52 in pendulum fashion so as to always remain in an upright position.

The ends of the levers 52 remote from the reservoir 56 extend along opposite sides of the tray 12 and terminate in down turned end portions 62 interconnected at their lower ends by means of a transverse bight portion 64 and a counterbalance tank 66 is supported from the bight portion 64 between the down turned end portions 62.

The tank 66 is fully closed, but includes a small breather opening 68 in its top wall 70, an upwardly and outwardly inclined drain neck 72 in its longitudinal side wall remote from the reservoir 56 and an inlet nipple 74 opening through the upper portion of the longitudinal side wall thereof adjacent the reservoir 56. The drain neck 72 has a flexible drain hose 76 connected thereto and a flexible supply hose 78 and its discharge end connected to the nipple 74, the hose 78 having variable flow valve and meter structure 80 serially connected therein.

A flexible drain hose 82 has its opposite ends secured through the bottom wall 18 of the tray 12 and the bottom wall 84 of the reservoir 56. Still further, a water supply 88 is disposed adjacent the garden structure 10 and has a supply hose 90 extending therefrom opening into a Y-fitting 92. The inlet end of the hose 78 is secured to the Y-fitting 92 and a second supply hose 94 having a flow control valve 96 and a flow meter 98 serially connected therein also has its inlet end coupled to the Y-fitting 92.

The outlet end of the hose 94 extends to a Y-fitting 100 and a pair of delivery hoses 102 and 104 extend from the Y-fitting 100, the hose 102 having a miniature adjustable drip cock 106 serially connected therein. The hose 104 extends from the Y-fitting 100 to a further Y-fitting 108 having the inlet end of a discharge hose 110 coupled thereto and the hose 110 is directed downwardly toward the inlet leg 112 of a horizontally disposed U-shaped fitting 114 including a discharge leg 116. The legs 112 and 116 of the fitting 114 extend through one side wall 118 of the reservoir 56 and the inner ends of the legs 112 and 116 are interconnected by means of an integral horizontal U-shaped bight portion 120 having an underside opening 122 formed therein. An overflow hose 124 is connected to the discharge leg 116 and may have its outlet end remote from the fitting 114 operatively associated with any suitable drain structure. Further, the outlet end of the hose 76 may also be operatively associated with a suitable drain structure.

Figure 4:
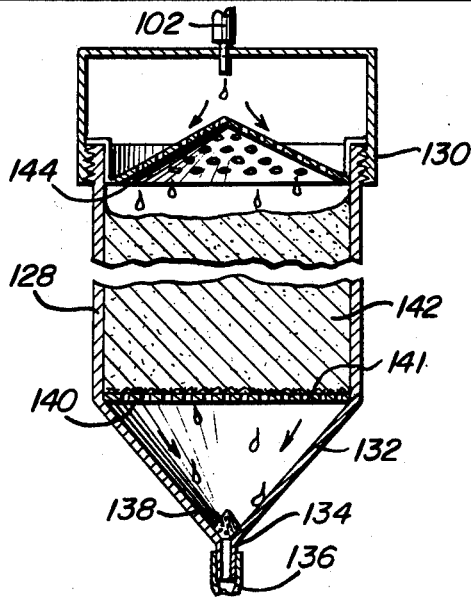
FIG. 4 is a fragmentary enlarged, vertical, sectional view, taken substantially upon a plane passing through the center of a liquid nutrient mixing container.

With attention now invited more specifically to FIG. 4 of the drawings, there may be seen a powdered nutrient container 128 including a threadedly supported and removable top cover 130. The lower end of the container 128 is inverted conical in configuration as at 132 and includes a lower apex drain 134 to which the inlet end of a discharge hose 136 is coupled. The outlet end of the hose 136 is coupled to the Y-fitting 108.

A suitable filter structure 138 is secured over the drain 134 and the interior of the container 128 includes a lower foraminated partition 140 covered from above by a fine mesh screen 141 and above which a suitable quantity of powdered nutrient 142 is disposed. An upper invested conical foraminated partition 144 is removably supported within the upper portion of the container 128 above the powdered nutrient 142. The discharge end of the hose 102 opens downwardly through the top cover 130 whereby water from the supply 82 may be slowly passed through the container 128 so as to be enriched by the soluble nutrient 142 disposed therein. Further, from FIG. 2 of the drawings, it may be seen that the container 128 is supported from one of the standards 24 by means of a suitable clamp structure 148.

With attention now invited more specifically to FIG. 5, a modified form of hydroponic garden structure referred to in general by the reference numeral 10' may be seen. The garden structure 10' is substantially identical to the garden structure 10 except that a fixed counterweight replaces the tank 66, and does not include a drain corresponding to the drain neck 72 or an inlet nipple corresponding to the inlet nipple 74. However, the counterweight 66' includes a horizontally outwardly projecting arm 67 and a block and tackle assembly referred to in general by the reference numeral 150 is supported from the end wall 16' corresponding to the end wall 16 as at 152 and anchored to the support arm 67 as at 154. Further, the line 156 of the block and tackle assembly 150 includes a free end portion which may be releasably engaged with an anchor structure 158 carried by the end wall 16'.

In operation, a suitable growning medium may be placed within the tray 12. Such a medium may comprise any suitable growth medium such as sand, sawdust, peat moss, perlite, or the like, or any mixture thereof. The reservoir 56 is then filled with a predetermined quantity of liquid nutrient 160, the desired amount of powdered nutrient 142 is placed within the container 128, the water supply 88 is turned on and the valves 96 and 106 and the flow meters 80 and 98 are adjusted as desired after the hoses 124 and 76 have had their outlet ends communicated with a suitable drain.

The variable flow valve and meter structure 80 is thereafter adjusted so as to allow a desired quantity of water from the supply 88 to pass into the tank 66. Thereafter, the variable flow valve and meter structure 80 is adjusted so as to allow only a small flow of water to flow into the tank 66.

The flow of water into the tank 66 is greater than the flow of water through the hose 94, the container 128 and the hose 104 into the hose 110. Accordingly, after a predetermined amount of water has been admitted into the tank 66, the weight of the latter will overbalance the levers 52 thereby causing the levers 52 to swing from the generally horizontally disposed positions thereof illustrated in FIG. 1 of the drawings to the inclined positions thereof illustrated in phantom lines in FIG. 2. As the levers 52 have the ends thereof from which the tank 66 is supported lowered, the reservoir 56 is elevated from a position depressed relative to the tank 12 to a position elevated with respect to the tank 12. Accordingly, the nutrient solution 160 within the reservoir 56 drains therefrom and into the bottom of the tray 12 through the hose 82. However, at the same time water tends to drain from the tank 66 through the hose 76, drainage of water from the tank 66 being controlled by the air vent opening or hole 68 and also by the size of the discharge hose 76, in order that drainage of the water from the tank 66 will be slower than drainage of the nutrient solution from the reservoir 56 into the tray 12. After all of the water drains from the tank 66, drainage of water from the tank 66 being at a greater rate than the admission of water into the tank 66 through the hose 78, the lever arms or support levers 52 are overbalanced on the ends thereof supporting the reservoir 56 whereby the lowered ends of the levers 52 supporting the tank 66 will swing upwardly to the limit positions thereof illustrated in FIG. 1 whereby the reservoir 56 will again be shifted to a position depressed relative to the tank 12. Accordingly, liquid nutrient within the tray 12 will drain back into the reservoir 56. Further, since the admission of water into the tank 66 through a hose 78 is at a very slow rate, the support levers 52 will remain in the horizontal position for perhaps as long as 24 hours before sufficient water is again admitted into the tank 66 in order to cause the ends of the support levers 52 from which the tank 66 is supported to again swing downwardly to the phantom line positions thereof illustrated in FIG. 2 whereupon liquid nutrient from the reservoir 56 will again be drained into the tray 12.

Inasmuch as a certain portion of the liquid nutrient 160 drained from the reservoir 56 into the tray 12 and back into the reservoir 56 will be lost to the plants growing within the tray 12 and as a result of evaporation, in order that continued automatic watering of the tray 12 with liquid nutrient may continue, the supply of liquid nutrient within the reservoir 56 must be gradually replaced. This is accomplished by water from the supply 88 passing upwardly through the hose 94 at a very slow rate. The majority of the water passing upwardly through the hose 94 passes downwardly through the hose 104 and into the hose 110. However, a very small portion of the water passing upwardly through the hose 94 and into the fitting 100 passes downwardly through the hose 102 and drips downwardly onto the partition 144 and is broken up into small droplets which then spread evenly over the partition 144 and pass downwardly therethrough into the nutrient powder 142 whereby the water is enriched by the nutrient powder 142 within the container 128. Thereafter, the enriched water passes downwardly from the container 128 through the hose 136 and into the hose 110. The total amount of water passing downwardly through the hose 110 enters the fitting 114 and drains therefrom through the opening 122 into the interior of the reservoir 56. However, if for any reason the amount of water passing downwardly through the hose 110, into the fitting 114 and being drained from the fitting 114 into the reservoir 56 through the opening 122 exceeds the rate of loss of liquid from the reservoir 56 due to watering of the growing medium within the tray 12, as the liquid nutrient level within the reservoir 56 reaches the level of the fitting 114 further liquid will not be discharged into the reservoir 56, but will instead pass outwardly from the discharge leg 116 of the fitting 114 and through the hose 124 to the drain with which the discharge end of the hose 124 is operatively associated. Thus, by utilizing only a small amount of water, the tray 12 may be repeatedly saturated with liquid nutrient solution and subsequently drained of excess liquid nutrient solution.

With attention now invited more specifically to FIG. 5 of the drawings, if the automatic watering concept of the hydroponic garden structure is not desired or required, the weight of the counterweight 66' is designed to exceed that which is necessary to overbalance the corresponding ends of the support levers from which the counterweight 66' is supported, even when the associated reservoir is full of liquid nutrient. In this case, when it is desired to admit liquid nutrient solution into the tray 12' of the structure 10', the line 156 is loosened from the anchor 158 and the adjacent ends of the associated support levers will be lowered by gravity, whereby the liquid nutrient reservoir corresponding to the reservoir 56 supported from the opposite ends of the support levers will be elevated to a position above the tray 12', and liquid nutrient may flow from the reservoir into the tray 12'. Then, when it is desired to again raise the counterweight 66' so as to lower the corresponding reservoir and allow liquid nutrient to drain back into the liquid reservoir from the tray 12', the line 156 is pulled in order to enable the block and tackle assembly 150 to raise the support arm 67 to the position thereof illustrated in FIG. 5, after which the line 156 is again secured to the anchor 158.

With attention now invited more specifically to FIG. 1 of the drawings, it may be seen that the four corners of the tray 12 include additional blocks 162 similar to the blocks 20 and including upwardly opening bores 164 in which the lower ends of four corner legs 166 supporting an upper horizontal frame 168 are seated. The frame 168 is disposed at an elevation above the support standards 24 and a downwardly opening screen mesh enclosure 170 is disposed over the frame 168 and fully encloses the legs 166 therein. The lower marginal edge portions of the cover 170 may be tightly secured to the corresponding walls of the tray 12, if desired. In addition, a downwardly opening flexible transparent cover 172 of suitable material such as plastic may be secured over the enclosure 170. The purpose of the cover 172 is to provide a means to produce a "green house effect" in the tray 12 which stabilizes the plant temperature variations, regulates solar radiation and aids in frost prevention in freezing weather. The purpose of the enclosure 170 is to exclude insects from whatever plants may be grown within the tray 12.

The foregoing is considered as illustrative only of the principles of the invention. Further, since numerous modifications and changes will readily occur to those skilled in the art, it is not desired to limit the invention to the exact construction and operation shown and described and, accordingly all suitable modifications and equivalents may be resorted to, falling within the scope of the invention.

What is claimed as new is as follows:

1. In combination, a horizontal tray, a liquid nutrient reservoir adapted to receive a predetermined amount of liquid nutrient therein, a support means supporting said reservoir in counterbalanced fashion for vertical shifting relative to said tray between an upper position elevated relative to said tray and a lowered position depressed relative to said tray, said support means, when said predetermined amount of liquid nutrient is disposed in said reservoir, being slightly overbalanced to cause said support means to shift said reservoir, by gravity, toward said depressed position, drain means communicating the lower portions of the interior of said tray and reservoir for draining of said nutrient from said reservoir into said tray upon movement of the reservoir to said upper position and return drainage of said nutrient from said tray into said reservoir upon subsequent movement of said reservoir to said depressed position, said support means including a counterbalance body counterbalancing said reservoir, said counterbalance body comprising a liquid tank including second drain means operative to drain said tank at a slower rate than said reservoir may drain into said tray, when said reservoir is in said elevated position, and weighting liquid supply means operative to supply weighting liquid to said tank at a rate slower than the rate at which liquid may drain therefrom through said second drain means.

2. The combination of claim 1 including liquid nutrient supply means operative to admit nutrient liquid into said reservoir at a rate considerably slower than the rate said weighting liquid supply means supplies weighting liquid to said tank.

3. The combination of claim 2 wherein said liquid nutrient supply means includes means operative to admit water into said reservoir from a suitable source and to add nutrient to said water at a controlled rate.

4. The combination of claim 3 wherein said means operative to admit liquid into said reservoir at a very slow rate includes excess liquid drain means for said reservoir to prevent the liquid level therein from exceeding a predetermined level.

5. The combination of claim 5 wherein said means operative to admit water into said reservoir and said means operative to supply weighting liquid to said tank include a common source of water under pressure.

6. The combination of claim 1 wherein said tray includes peripherally spaced uprights, a closed horizontal support frame supported from and extending between the upper ends of said uprights, and a downwardly opening flexible cover disposed over said frame and uprights at least substantially fully enclosing the area above the sides of said tray to the height of said frame.

7. The combination of claim 6 wherein said flexible cover comprises a mesh type cover defining air flow openings therethrough.

8. The combination of claim 6 wherein said flexible cover comprises a transparent substantially air impervious cover.

* * * * *